United States Patent [19]

Smith

[11] 3,967,716

[45] July 6, 1976

[54] APPARATUS FOR LOADING CARTONS

[76] Inventor: John S. Smith, 3000 Colorado Ave., Boulder, Colo. 80303

[22] Filed: Dec. 9, 1974

[21] Appl. No.: 530,809

[52] U.S. Cl. .............................. 198/24; 198/31 AB; 198/279; 214/6 P
[51] Int. Cl.² .................. B65G 47/26; B65G 47/24
[58] Field of Search............ 214/6 P, 6 B; 198/31 R, 198/24, 31 AB, 278, 279, 280, 282

[56] References Cited
UNITED STATES PATENTS

| | | | |
|---|---|---|---|
| 1,734,868 | 11/1929 | Milne................................. | 198/280 |
| 2,703,653 | 3/1955 | Thomson........................... | 214/6 G |
| 2,870,922 | 1/1959 | Thomson........................... | 214/6 P |
| 2,905,295 | 9/1959 | Anderson.......................... | 198/280 |
| 3,139,196 | 6/1964 | Legocki............................. | 214/6 B |
| 3,189,159 | 6/1965 | Shields............................. | 198/280 X |
| 3,308,971 | 3/1967 | Sinden et al. ..................... | 214/6 B |

Primary Examiner—Robert B. Reeves
Assistant Examiner—David A. Scherbel
Attorney, Agent, or Firm—Burton, Crandell & Polumbus

[57] ABSTRACT

An apparatus for assembling cartons and delivering the cartons in rows to preselected locations includes a framework upon which a conveyor is positioned to receive cartons and to advance the cartons to an assembly station, a stop gate at the assembly station adapted to stop-forward movement of the cartons as they are received at the assembly station, a positioning gate at the assembly station mounted for lateral, reciprocal movement to alternately shift cartons received at the assembly station in opposite lateral directions until a complete row of cartons extending laterally of the apparatus is assembled at the assembly station and a pair of pusher members disposed adjacent the assembly station to push the assembled row of cartons off the forward end of the apparatus.

The method of the present invention includes the steps of advancing cartons in a first direction, terminating movement of the carton in the first direction at an assembly station, alternately moving cartons at the assembly station in opposite directions perpendicular to said first direction to form a row of cartons at the assembly station, and advancing the cartons as a row in said first direction to deliver the cartons to a preselected location.

8 Claims, 5 Drawing Figures

U.S. Patent  July 6, 1976  Sheet 2 of 2  3,967,716
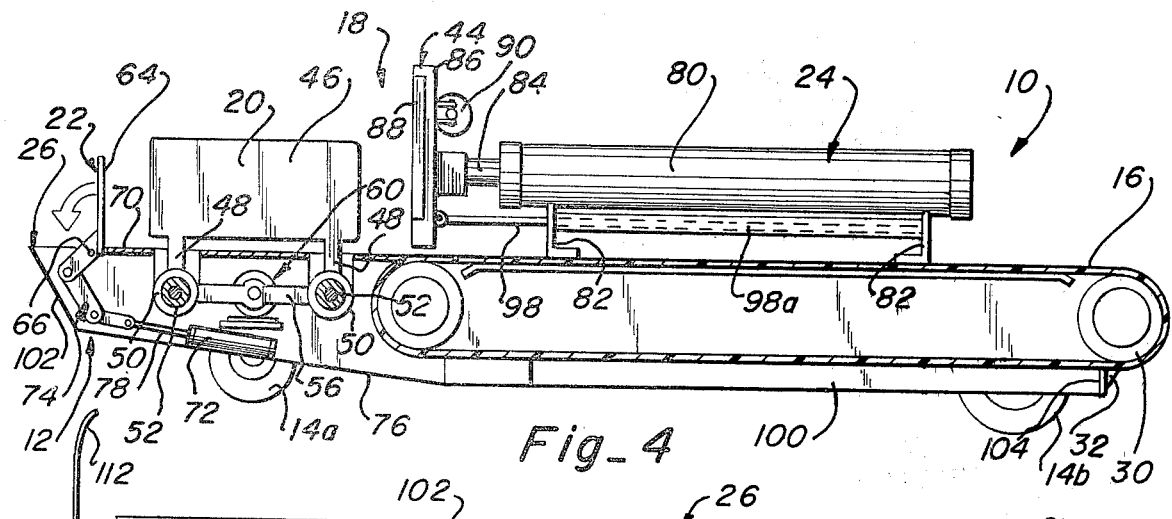
Fig_4
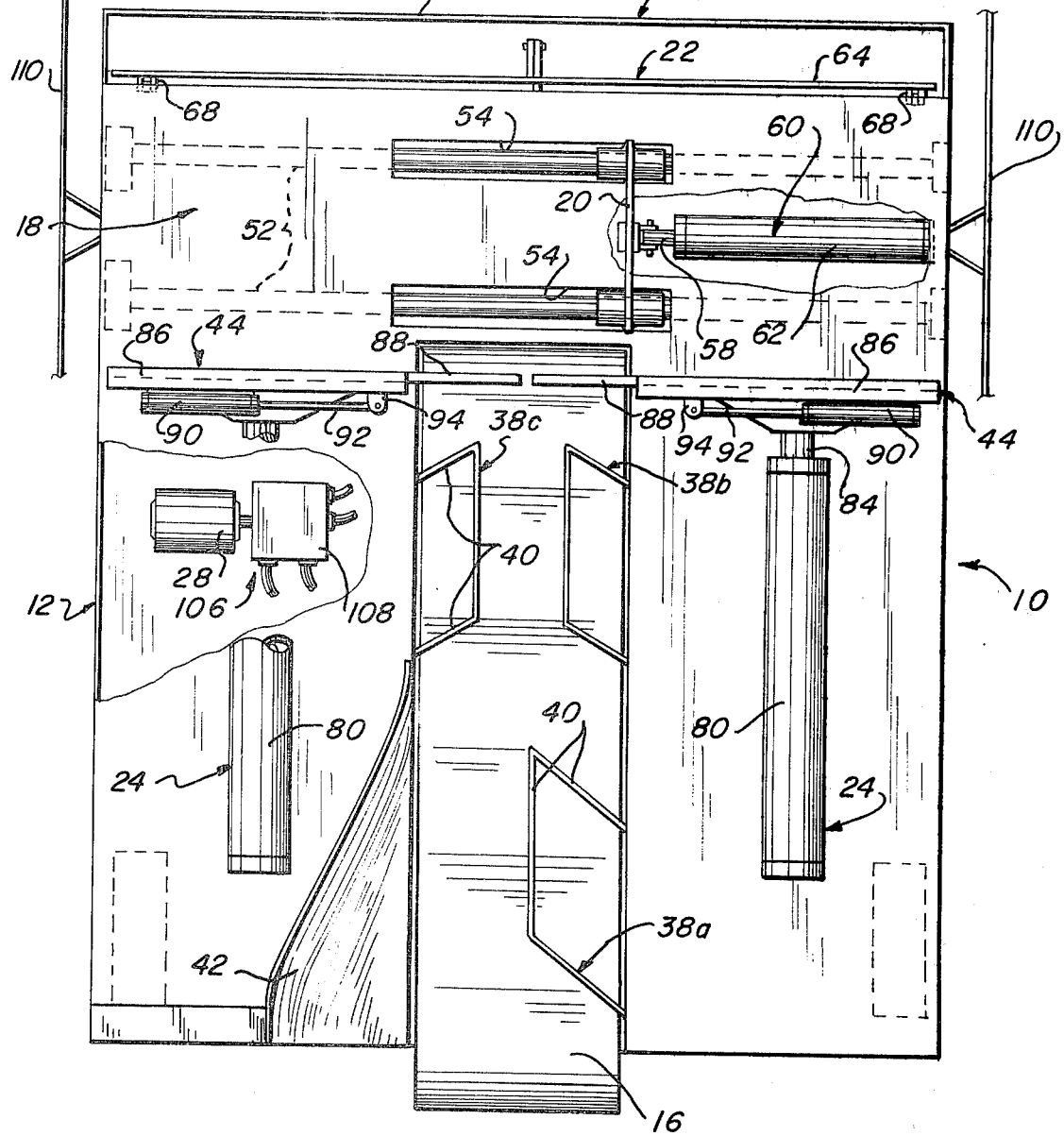
Fig_5

APPARATUS FOR LOADING CARTONS

BACKGROUND OF THE INVENTION

Agricultural goods such as fruits and vegetables are typically packed in crates or cartons after harvest and the crated goods are then transported to their destination by truck or rail. In many instances, 14b containerized goods are packed into the truck or rail car by hand necessitating many man hours and hard physical labor. Produce shippers, as well as other business entities requiring shipment goods, containerized good, have long been desirous of a reliable system for loading trucks or rail cars with the containerized goods and particularly of an apparatus which is somewhat mobile so that it can be used at sites where completely automatated systems for containerizing goods and packing the goods are not available.

OBJECTS OF THE INVENTION

It is an object of the present invention to provide a new and improved system for loading containerized goods into a transport vehicle.

It is another object of the present invention to provide a new and improved apparatus for loading containerized goods into a transport vehicle by assembling the containers in transverse rows and advancing the rows of containers off the forward end of the apparatus in a sequential manner until the vehicle is completely filled.

It is another object of the present invention to provide a new and improved apparatus for loading containerized goods into a transport vehicle which includes means for advancing the cartons to an assembly location where they are alternately shifted in opposite lateral directions until a row of the cartons have been assembled and means for advancing the row of cartons off the forward end of the apparatus at a desired location.

It is another object of the present invention to provide a new and improved method for loading containerized goods into a transport vehicle.

It is another object of the present invention to provide a new and improved method for loading containerized goods into a transport vehicle wherein the containers are advanced in a first direction to an assembly station, are alternately shifted in opposite lateral directions at the assembly station until a row of containers has been assembled and are finally advanced in the first direction as a row to the preselected location.

SUMMARY OF THE INVENTION

The apparatus of the present invention is mobile and of a size so as to be movable into a transport vehicle such as a truck or rail car, to load the vehicle with containerized goods in an orderly manner. The apparatus includes a conveyor for advancing containers one at a time to an assembly station where a positioning gate alternately moves the containers arriving at the assembly station in opposite lateral directions until a row of containers has been formed. The row of containers are then forced off the leading end of the apparatus by pusher rams into the desired location within the transport vehicle. The apparatus additionally includes means for rolling a container onto its side if it is desired to load the cartons into the vehicle on the side rather than the bottom, such as for example, to more adequately fill the available space in the vehicle. The means for rolling the containers onto their sides includes an arm member protruding partially over the conveyor means so as to urge the container partially off one side of the conveyor where the side edge of the container rides up onto a ramp which gradually lifts the side edge until the container rolls over onto its side on the conveyor belt.

In accordance with the method of the present invention, containerized goods are advanced in a first direction to an assembly station and are alternately moved in opposite directions at the assembly station at an angle to the first direction until a row of the containers is assembled. Subsequently, the containers are advanced as a unitized row from the assembly location to the desired destination within the transport vehicle. This procedure is continuously repeated each time depositing the assembled row of containers at a desired location within the transport vehicle until a completed layer of the assembled containers is formed. Subsequently, the apparatus can be advanced over the assembled layer of containers to form an overlying layer and additional overlying layers can be assembled until the entire vehicle is filled to the desired height.

BRIEF DESCRIPTION OF THE DRAWINGS

FIG. 4 is an enlarged diagrammatic longitudinal section taken along line 4—4, FIG. 3, FIG. 5 is an enlarged diagrammatic top plan view of the apparatus of FIG. 1 with parts removed to best illustrate the apparatus.

DESCRIPTION OF THE PREFERRED EMBODIMENT

Figure 1:
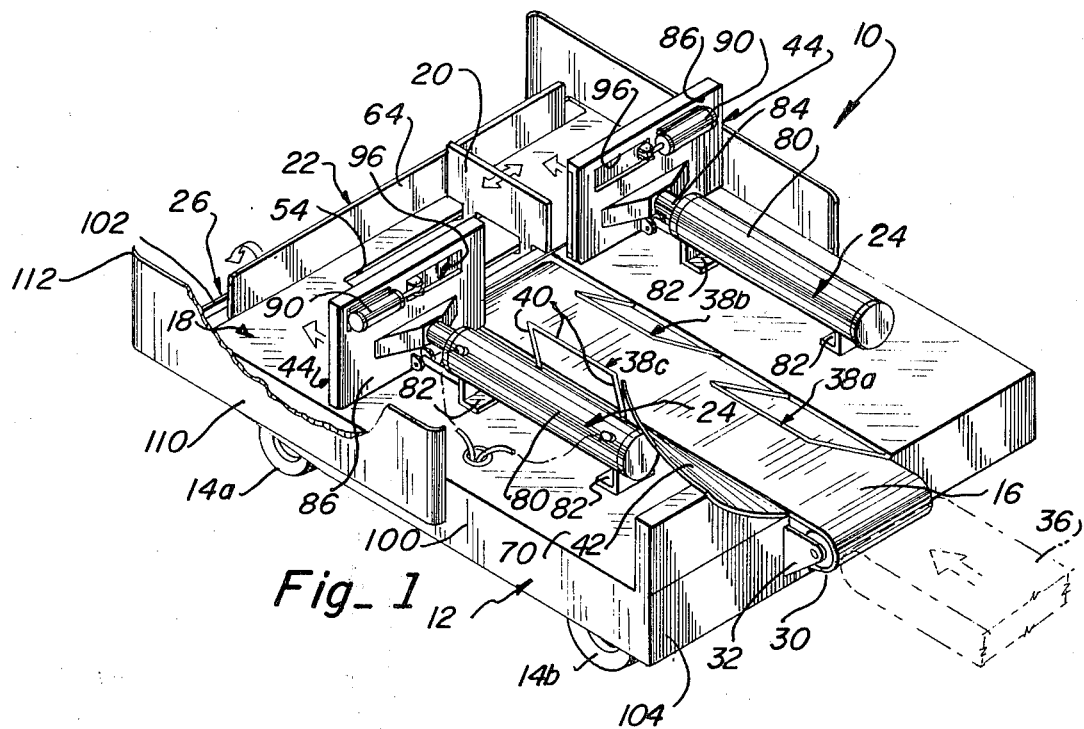
FIG. 1 is a perspective view of the apparatus of the present invention.

Referring first to FIG. 1, the carton loading apparatus 10 of the present invention can be seen to include a base frame 12 mounted upon front and rear pairs of wheels 14a and 14b respectively and having an advancement conveyor 16 adapted to advance containers C to an assembly station 18 wherein a positioning plate 20 is mounted for lateral reciprocal movement and a stop gate 22 is positioned to retain the containers at the assembly station until an entire row of containers has been assembled. A pair of pusher rams 24 are mounted on the frame 12 on opposite sides of the advancement conveyor 16 and are adapted to push an assembled row of containers off the leading end 26 of the frame when the stop gate 22 is lowered.

The advancement conveyor 16, in the preferred form, is a conventional belt conveyor driven in a conventional manner by a motor 28 mounted within the frame 12 of the apparatus. The conveyor belt is built into the frame and passes around an idler roller 30 at the trailing end of the apparatus. The idler roller is mounted upon bracket members 32 which protrude rearwardly from the trailing end of the frame at a centered location thereon to make it easy for a workman to place containers, such as cartons, crates, or the like, upon the conveyor belt. In instances where the containers C to be loaded into a transport vehicle 34 are not immediately adjacent to the vehicle, a system of auxiliary conveyor belts 36, one of which is shown in phantom lines in FIGS. 1 through 3, may be aligned to transport the containers to the trailing end of the advancement conveyor belt 16. A set of alignment arms 38a, 38b, and 38c are mounted on the frame on opposite sides of the conveyor belt to desirably position and align containers as they are advanced along the conveyor belt to the assembly station 18.

The alignment arms 38a, 38b, and 38c each consist of three pivotally connected links 40 which form a parallelogram linkage arrangement so that by relative pivotal movement of the links, the alignment arms can be made to extend any desired distance over the conveyor belt 16 to urge containers C moving along the belt into desired positions. The link 40 at the rearward most end of each alignment arm is inclined in a forward direction so that when a container engages the arm the inclined link will allow the front end of the container to slide there along until it is repositioned on the conveyor belt at the desired location. Two of the alignment arms 38a and 38b are disposed along the right side of the conveyor belt, as viewed in FIGS. 1 through 3, and the third alignment arm 38c is positioned along the left side of the belt near the forward end of the belt. It will, therefore, be appreciated, that the alignment arm 38a near the rearward end of the apparatus on the right side of the conveyor belt serves to preliminarily position a container on the belt at the desired location and the alignment arms 38b and 38c on opposite sides of the belt at the forward end of the belt serve to align the containers so that they do not enter the assembly station in a skewed orientation. The alignment arms 38b and 38c at the forward end of the belt define a space therebetween which is substantially equal to the width of the containers being advanced along the belt, FIG. 2, so that in order for a container to pass between the arms, it must assume an orientation which is aligned with the direction of movement of the belt. The angular relationship of the link members 40 of each positioning arm can be locked as desired with any suitable means, not shown, so that containers engaging the arms will not disrupt the angular relationship of the link members.

A flat inclined ramp 42 is mounted upon the top of the frame 12 of the apparatus along the left edge of the conveyor belt 16. The ramp is curved so as to form an increasing angle with horizontal in a forward direction so that the forward end of the ramp forms an angle which is slightly greater than 45° with horizontal. This ramp is made of a smooth, preferably long wearing metallic material and serves to tip containers C moving along the conveyor belt onto an adjacent side. The purpose for tipping or rolling the containers from one side to another is to re-orient the containers to take optimum advantage of the available space in the transport vehicle. In other words, the width of the vehicle 34 may be such that gaps would exist along the sides of the vehicle when the containers were packed in one orientation but by packing the containers in a different orientation wherein they rested on a different side to vary the width of the container, the space within the vehicle could be more fully occupied by the containers. The ramp 42 has its lower edge positioned immediately adjacent to the left edge of the conveyor belt, as viewed in FIGS. 1 through 3, and extends along the conveyor belt to the rearward most end of alignment arm 38c. When it is desired to roll containers moving along the conveyor belt onto an adjacent side, the alignment arm 38a near the rearward end of the conveyor belt, which is on the opposite side of the conveyor belt from the inclined ramp, is extended outwardly so that it urges the containers moving along the conveyor belt off the left side of the belt where the left edge of the container is caused to ride up onto the ramp until the original bottom surface of the container forms a greater angle than 45° with horizontal whereupon gravity will cause the container to roll onto its right side. Further movement of the container along the conveyor belt causes it to pass between the alignment arms 38b and 38c on opposite sides of the conveyor belt at the forward end of the belt where the container is aligned with the line of movement of the conveyor before it is advanced into the assembly station.

The assembly station 18 extends the entire width of the frame 12 of the apparatus and is defined between the stop gate 22 at the forward edge of the assembly station and pusher plates 44 on the forward ends of the pusher rams 24. The positioning plate 20, as best illustrated in FIGS. 4 and 5, which is disposed at the assembly station, comprises a generally rectangularly shaped body portion 4b with depending legs 48 at opposite sides thereof carrying cylindrical sleeves 50 on their lower ends. The longitudinal axes of the sleeves 50 are horizontal and extend transversely of the apparatus. The sleeves 50 are slidably received on a pair of spaced parallel guide rods 52 which are anchored at opposite ends to the sides of the frame 12 of the apparatus. The depending legs 48 of the positioning plate extend through a pair of spaced parallel slots 54 cut in the top wall of the frame. A cross member 56 interconnects the sleeves 50 on the positioning plate and is anchored at its center to the piston rod 58 of a power cylinder 60, preferably of the hydraulic type, which has the body 62 thereof anchored to a side wall of the frame 12. Actuation of the power cylinder 60 causes the piston rod 58 to move transversely of the apparatus and in a direction dependent upon the application of pressure in the cylinder. It will, therefore, be appreciated that extension and retraction of the piston rod 58 of the power cylinder will cause the positioning plate 20 to move back and forth transversely of the apparatus. The particular sequential operation of the positioning plate will be described later.

The stop gate 22 at the forward end of the apparatus consists of a generally rectangular plate member 64 which extends transversely of the apparatus and is anchored along its lower edge to a pivot rod 66 journaled at opposite ends in a pair of brackets 68 anchored to the top wall 70 of the frame 12. The pivot rod 66 of the stop gate is connected at opposite ends to a pair of power cylinders 72 through suitable linkage 74. The power cylinders 72 are mounted on the bottom wall 76 of the frame on opposite sides of the frame. Extension and retraction of the piston rods 78 of the power cylinders 72, which are operated in unison, cause the plate member 64 of the stop gate to rotate about the pivot rod through a 90° angle, as indicated by the arrow in FIG. 4, to move the plate member from a vertical stop position to a horizontal open position.

In the vertical stop position, the plate member 64 serves to limit forward movement of containers C delivered to the assembly station 18 by the conveyor belt and retain the leading edges of the containers at a preselected position even during lateral shifting of the containers by the positioning plate 20. Of course, when the stop gate 22 is in its horizontal open position, the containers assembled at the assembly station can be shoved off the apparatus in a forward direction to deposit them at the preselected location within the transport vehicle.

The pusher ram members 24 are identical and each consists of a power cylinder 80, preferably of the hydraulic type, anchored to the top wall 70 of the frame by spaced bracket members 82 with the piston rod 84 of the power cylinder carrying the pusher plate member 44 on its distal end. The pusher plate members 44 consist of two component parts, an outer part 86 having a hollow cavity therein and an inner part 88 slidably retained within the hollow cavity. A fluid actuated power cylinder 90 is mounted upon the rear face of each outer part 86 and has its piston rod 92 connected to a bracket 94 on the rear face of the associated inner part 88 to effect sliding movement of the inner part in a direction toward the inner part on the other pusher ram. Each outer part has a slot 96 in its rear face through which the bracket 94 on the inner part protrudes. The inner parts are normally retained within the outer parts while containers are being assembled in a row at the assembly station. But after a row of containers has been assembled and is ready to be advanced off the apparatus to the desired location within the transport vehicle, the inner parts 88 are advanced inwardly toward each other leaving only a small gap therebetween, FIG. 3, sufficient to accommodate the positioning plate 20 so that the plate members 44 can be advanced by the power cylinders 80 to shove the containers at the assembly station off the forward end 26 of the apparatus. The inward extend of the inner parts is sufficient to engage containers at the assembly location which are in alignment with the conveyor belt 16 so that the pusher plate members engage every container at the assembly station for uniform advancement off the forward end of the apparatus. To stabilize the spatial orientation of the plate members 44, a guide rod 98 is anchored to the lower edge thereof and is slidably received in a sleeve 98a connected to bracket members 82 which support the power cylinders 80.

The frame 12 for the apparatus, as best illustrated in FIG. 4, includes the previously mentioned top wall 70 and bottom wall 76 and has opposite side walls 100, an inclined front wall 102 and rear wall 104. The walls of the frame cooperate in defining a hollow chamber in which the power means 106 for the apparatus is enclosed. The power means 106 for the apparatus includes the motor 28 which drives the conveyor belt 16 and also drives a hydraulic pump 108 which is connected to the various power cylinders used in the apparatus for operation thereof. Of course, actuation suitable switching system (not shown) is provided to control acuation of the various power cylinders and their operation can be automatically controlled with suitable electronic circuitry so that the various parts of the apparatus are operated in sequence according to the method to be described hereinafter.

Preferably, the frame 10 of the apparatus is sized to be slightly smaller than the width of the transport vehicle 34 to be loaded and a pair of guide rails 110 on opposite sides thereof having inturned leading ends 112 are provided to guide the apparatus into the transport vehicle.

In operation of the apparatus of the present invention in accordance with the method of the invention, the apparatus is first rolled into the transport vehicle until there is enough space between the forward end 114 of the cargo space of the vehicle and the forward end 26 of the apparatus to accommodate one row of cartons. Suitable auxiliary conveyor belts would be positioned in alignment with the advancement conveyor belt 16 to carry containers C from their storage position at the loading dock or the like to the advancement conveyor. The conveyor is then actuated to move in a counterclockwise direction, as viewed in FIG. 4, and containers to be loaded into the transport vehicle 34 are placed on the conveyor belt. As the containers advance along the conveyor belt, the alignment arm 38a near the rearward end of the apparatus straightens the containers out so that they are oriented in a direction parallel to the direction of movement of the conveyor belt and the alignment arms 38b and 38c near the forward end of the conveyor belt center the containers so that they are delivered to the assembly station 18 in the desired orientation.

Figure 2:
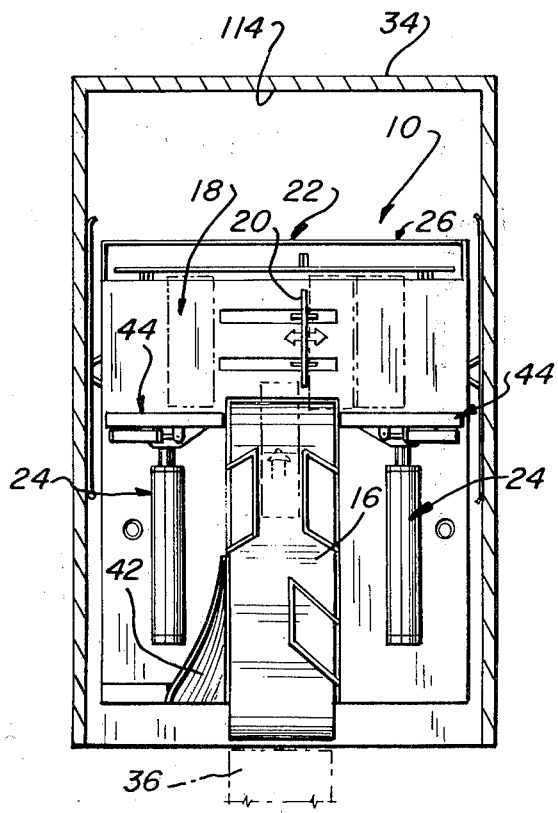
FIG. 2 is an operational top plan view of the apparatus of FIG. 1 received within a transport vehicle, and with containers being assembled shown in phantom lines.

The positioning plate 20 which is disposed on one side or the other of the containers as they are delivered to the assembly station, is actuated to shift the position of the container laterally of the apparatus. This operation is illustrated in FIG. 2 wherein the first container delivered to the assembly station has been shifted to the right, the second container shifted to the left, the third container shifted to the right to abut the first container and the fourth container, which is shown being delivered to the assembly station, will be ready to be shifted to the left. This sequence is continued until a complete row of containers, for example seven, has been assembled at the assembly station. It will be appreciated that the third container delivered to the left or to the right will shove the two containers previously delivered to that side so that before the seventh container is delivered to the station, there will be three containers on each side of the positioning plate and the positioning plate will be situated so as to allow the seventh container to be delivered to the assembly station at the middle of the row. As will be appreciated by reference to FIG. 2, each container at the assembly station, has its leading end in abutment with the stop gate 22 so that the containers are in perfect alignment when they are completely assembled.

Figure 3:
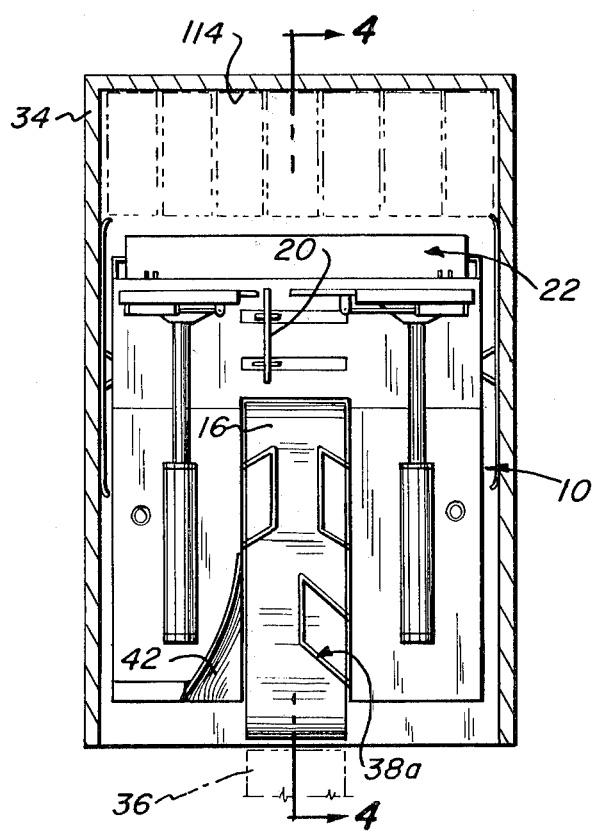
FIG. 3 is an operational top plan view similar to FIG. 2 with the containers shown in phantom lines being advanced off the leading end of the apparatus.

After the containers have been assembled at the assembly location, the operation of the positioning gate 20 is terminated and the stop gate 22 is lowered to its open position, FIG. 3. Next, the piston rods 92 on the power cylinders 90 are extended, as shown in FIG. 3, so that the inside parts 88 of the pusher plates 44 of the pusher rams are extended inwardly toward each other in a position to engage the containers at the assembly station which are in alignment with the conveyor belt. Next, the piston rods 84 of the power cylinders 80 are extended to cause the pusher plate members 44 to be advanced forwardly in a fairly rapid manner so that the containers in the assembly station are shoved off the leading end of the apparatus in a sudden manner so that they actually fly, to a limited extent, off the leading end of the apparatus and are, therefore, not allowed to tumble over as they are deposited in the transport vehicle.

Following deposition of the containers in the transport vehicle, the piston rods 84 of the power cylinders 80 are retracted to withdraw the pusher plates to the position shown in FIG. 2, the inner parts 88 of the pusher plates are retracted into the outer members 86, and the stop gate 22 is raised to its stop position of FIGS. 1 and 2. Of course, while the containers are being shoved off the leading end of the apparatus the conveyor belt is stopped so that no additional containers are delivered to the assembly station. After the pusher plates have been withdrawn to the position of FIG. 2, and the stop gate is raised the conveyor belt is again actuated to deliver containers to the assembly station so that a repeat of the aforedescribed process can take place.

Before the second row of containers assembled at the assembly station are shoved off the leading end of the apparatus, the apparatus is raised by any auxiliary lift means (not shown) a distance approximately equal to the height of the previously formed row so that the second row of containers can be deposited on top of the first row of containers. This operation is continued until a complete vertical array of containers has been formed by depositing successive rows of containers in the transport vehicle on top of each other. A subsequent vertical array of containers is then formed immediately in front of the first vertical array after retracting the apparatus a short distance to allow space for the second vertical array. Successive vertical arrays of containers are formed in an identical manner until the vehicle has been filled to the desired extent.

It will be appreciated that the apparatus of the present invention is made with a minimum of operative parts necessary to carry out the process and is preferably made of fairly light weight material. Further, the apparatus is shallow in height so that it can stack containers into a transport vehicle to within a very close distance of the top of the vehicle, this distance being substantially equal to the height of the apparatus.

Although the present invention has been described with a certain degree of particularity, it is understood that the present disclosure has been made by way of example and that changes in details of structure may be made without departing from the spirit thereof.

I claim:

1. Apparatus for assembling containers and delivering the containers in rows to a preselected location comprising:
   a. conveyor means for advancing containers in a first direction to an assembly location,
   b. positioning means at said assembly location for selectively moving said containers in a second direction at an angle relative to said first direction to form a row of said containers, and
   c. at least one ram member disposed adjacent to one side of said conveyor means which is selectively operable in engaging the row of containers at the assembly location along the length of the row to push the row as a unit in said first direction, said ram member including a selectively extensible plate means adapted to be extended at least partially across said conveyor to engage a container in said row in alignment with the conveyor.

2. The apparatus of claim 1 wherein said positioning means includes a plate member reversibly movable in said second direction to alternately move containers in opposite directions at said assembly location until a row of said containers is formed.

3. The apparatus of claim 1 wherein there are two of said rams with one positioned on each side of the conveyor means.

4. The apparatus of claim from wherein each ram has a plate member adapted to engage a portion of the row of containers and at least one of the plate members is selectively extensible in said second direction at least partially across said conveyor means and into a position to engage a container at the assembly location which is aligned with the conveyor means when the rams are activated to remove the row of containers sfrom the assembly location.

5. The apparatus of claim 1 further including orienting means operative upon the containers to change the side of the containers upon which they are supported.

6. The apparatus of claim 5 wherein said orienting means includes an inclined ramp across which the containers pass as they are advanced along the conveyor means, said ramp being adapted to tilt each container until it rolls from its originally supporting side to another supporting side.

7. The apparatus of claim 6 wherein said ramp is disposed along one side of the conveyor means and a bias arm is disposed oppositely of the ramp on the other side of the conveyor means, said bias arm extending partially over the conveyor means to urge containers moving along the conveyor means onto the ramp.

8. The apparatus of claim 1 further including a frame on which said conveyor means, positioning means, and ram member is mounted, and a set of wheels supporting said frame for rolling movement along a supporting surface.

* * * * *